Jan. 13, 1931.  S. GIANDALIA  1,788,764
WEED CUTTER
Filed Sept. 15, 1928   2 Sheets-Sheet 1
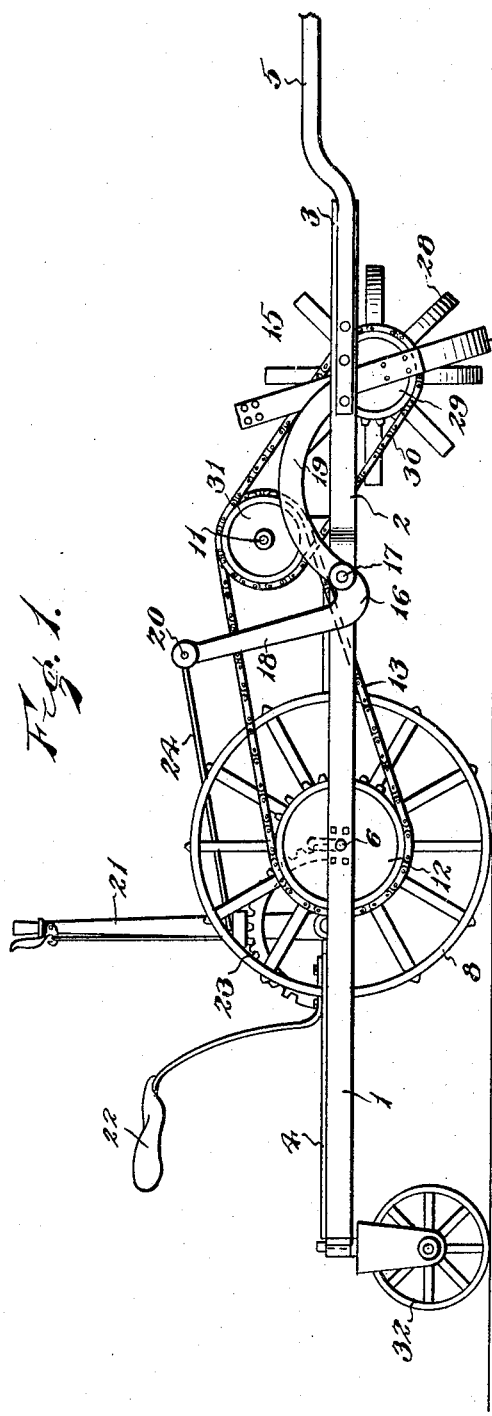
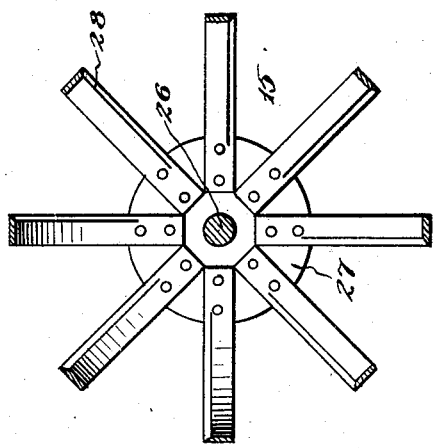
Inventor
S. Giandalia
By Lacey & Lacey, Attorneys Jan. 13, 1931.     S. GIANDALIA     1,788,764
WEED CUTTER
Filed Sept. 15, 1928     2 Sheets-Sheet 2
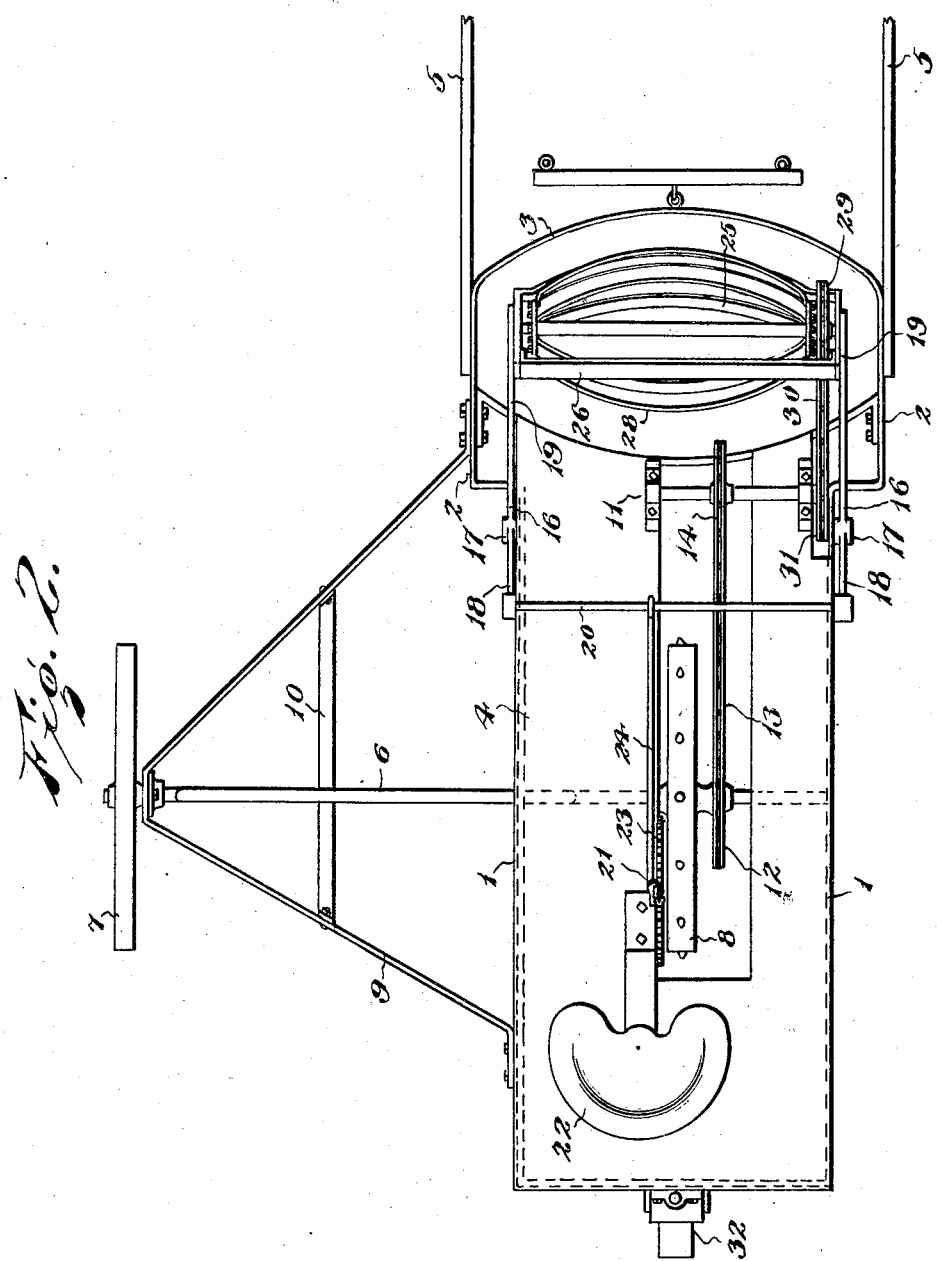
Inventor
S. Giandalia
By Lacey & Lacey, Attorneys Patented Jan. 13, 1931

1,788,764

UNITED STATES PATENT OFFICE

SALVATORE GIANDALIA, OF AMITE, LOUISIANA

WEED CUTTER

Application filed September 15, 1928. Serial No. 306,229.

This invention relates to field implements, and more particularly to a machine for destroying weeds, grass and analogous growth, tending to hinder the cultivation of strawberry plants.

The invention provides a machine which may be drawn or otherwise propelled over the field between adjacent rows of plants, and which will cut down and destroy grass and weeds, thereby preventing choking of the plants while insuring a promotion of the growth thereof.

While the drawings illustrate a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof reference is to be had to the following description and the drawings hereto attached, in which:

Figure 1 is a side view of a weed cutter illustrating an embodiment of the invention.

Figure 2 is a top plan view of the machine.

Figure 3 is a central sectional view of the rotary cutter showing the parts on a larger scale.

Corresponding and like parts are referred to in the following description and designated in the several views of the drawings by like reference characters.

The machine is mounted upon wheels and is constructed to operate between adjacent rows of plants and is stabilized by a wheel disposed to run in the space paralleling the space in which the grass and weeds are being destroyed. The main frame includes longitudinal or side bars 1 which are offset at their front ends, as indicated at 2, and connected by means of a transverse bar 3 which is forwardly curved intermediate its ends. A platform 4 is mounted upon the main frame and secured thereto in any determinate way. Thills 5 are secured to the offset portions 2 of the main frame and provide convenient means for hitching a horse to the machine for drawing it over the field when in service. An axle 6 is mounted in the main frame and projects laterally therefrom and receives wheels 7 and 8. A brace 9 supports the outer end of the axle 6 and is bolted or otherwise secured to a side bar of the main frame. The brace 9 is substantially of V-form and is strengthened by means of a stay 10. The wheel 8 constitutes a driver for operating the cutting mechanism. A transverse shaft 11 parallels the axle and is connected to the wheel 8 to be operated thereby. A sprocket wheel 12 rotatable with the ground wheel 8, is connected by means of a sprocket chain 13 to a sprocket wheel 14 fast to the shaft 11. Power is taken from the shaft 11 to operate the rotary cutter 15 which destroys the grass and weeds when the machine is in operation.

The rotary cutter 15 is mounted in a frame which includes similar or like side members 16 which are pivoted intermediate their ends to the main frame at 17. Each of the members 16 comprises an upright 18 and a forwardly and downwardly curved portion 19. A transverse rod 20 connects the upper ends of the elements 18. A lever 21 pivoted at its lower end to the platform 4, extends within convenient reach of the driver's seat 22 and is provided with the usual hand latch for cooperation with a toothed segment 23 whereby the lever is held in the required adjusted position. A rod 24 connects the lever 21 with the transverse rod 20. Movement of the lever 21 effects a pivotal movement of the frame comprising the members 16 and a corresponding vertical adjustment of the cutting mechanism carried thereby. A blade 25 has its end portions bent and secured to the lower forward ends of the curved portions 19 of the side members 16. A cross bar 126 forms a tie and connects the upwardly bent end portions of the blade 25. It will thus be understood that a pivotal movement of the frame comprising the side members 16 effects a vertical adjustment of the cutting mechanism.

The rotary cutter 15 includes a shaft 26, plates 27 fast to the ends of the shaft 26, and cutters 28 which curve outwardly between their ends. The terminal portions of the cutters 28 are secured to the plates 27. The curved or bulged outline of the cutters 28 results in the provision of a rotary cutter which is of maximum diameter at a middle point and which tapers toward opposite ends, as indicated most clearly in Figure 2 of the drawings.

The blade 25 curves in conformity to the curvature of the cutters 28 with which it coacts to destroy the grass and weeds. A gear wheel 29 fast to an end of the rotary cutter 15 is connected by means of a sprocket chain 30 to a sprocket gear 31 fast to the shaft 11, thereby admitting of the rotary cutter 15 being driven from the said shaft when the machine is in action.

A caster wheel 32 supports the rear portion of the machine and is in line with the ground wheel 8.

The machine is of such proportions as to admit of the cutting mechanism operating in the space formed between adjacent rows of plants. The wheels 8 and 32 travel in the center of the space from which the weeds and grass are removed. The wheel 7 travels midway of the space adjacent and paralleling the space acted upon by the machine for exterminating the objectionable growth to be destroyed. It will thus be understood that the wheel 7 operates to stabilize the machine in its travel over the field, one row of the plants being disposed between the wheel 7 at one side and the wheels 8 and 32 at the opposite side.

Having thus described the invention, what is claimed is:

1. A weed cutter comprising a main frame including side bars having laterally extending portions offset at their forward ends, a supplemental frame pivoted to the main frame at the rear of and extending across the laterally extending portions, a cutting mechanism mounted upon the supplemental frame and disposed in advance of the laterally extending portions of the main frame, and means mounted upon the main frame for pivotally adjusting the supplemental frame whereby to vertically adjust the cutting mechanism.

2. A weed cutter comprising a main frame, a supplemental frame including similar side members pivoted intermediate their ends to the main frame and comprising a rear upright portion and a forwardly and downwardly curved portion, means connecting the upright portions of the side members, a relatively stationary blade having its end portions bent upwardly and connected to the lower ends of the forwardly and downwardly curved portions of said side members, a rotary cutter mounted upon the pivoted frame at the ends of the stationary blade and bowed outwardly from end to end to coact with said blade, and means mounted upon the main frame for pivotally adjusting the frame carrying the cutting mechanism whereby to adjust the latter vertically.

3. A weed cutter comprising a main frame, an axle mounted upon the main frame and projecting laterally therefrom for some distance, wheels at opposite ends of the axle, the one constituting a driver and the other a stabilizer, a caster wheel at the rear of the main frame in line with the drive wheel, a rotary cutter at the front end of the main frame, and connecting means between said rotary cutter and the drive wheel.

4. A weed cutter comprising a main frame including side bars which are laterally offset at their forwad ends and connected by means of a cross bar, a supplemental frame including side members pivoted intermediate their ends and having their rear portions extended upwardy and their forward portions curved downwardly, a curved blade connecting the lower forward ends of said side members, a rotary cutter coacting with the blade and tapering toward opposite ends from a central point and mounted upon the supplemental frame, means mounted upon the main frame for pivotally adjusting the supplemental frame to vertically adjust the cutting mechanism, an axle mounted upon the main frame and projecting laterally therefrom, wheels upon opposite end portions of the axle, the one constituting a driver and the other a stabilizer, connecting means between the drive wheel and the rotary cutter, and a caster wheel at the rear of the main frame substantially in line with the drive wheel.

5. A rotary weed cutter comprising a plurality of blades bowed outwardly between their ends and connected at their ends to rotate about a common axis.

6. A cutting mechanism comprising a relatively stationary blade bowed from end to end, and a bowed cutter mounted at its ends for rotation about an axis passing through the ends of the relatively stationary blade.

In testimony whereof I affix my signature.

SALVATORE GIANDALIA. [L. S.]